(12) United States Patent
Fan et al.

(10) Patent No.: US 9,825,708 B2
(45) Date of Patent: Nov. 21, 2017

(54) COMPENSATION APPARATUS AND METHOD FOR INTER-CHANNEL NONLINEAR DAMAGE

(71) Applicant: FUJITSU LIMITED, Kawasaki-shi, Kanagawa (JP)

(72) Inventors: Yangyang Fan, Beijing (CN); Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/513,689

(22) Filed: Oct. 14, 2014

(65) Prior Publication Data

US 2015/0104189 A1 Apr. 16, 2015

(30) Foreign Application Priority Data

Oct. 15, 2013 (CN) .......................... 2013 1 0481659

(51) Int. Cl.
*H04B 10/2507* (2013.01)
*H04B 10/2557* (2013.01)
(Continued)

(52) U.S. Cl.
CPC ..... *H04B 10/2557* (2013.01); *H04B 10/0795* (2013.01)

(58) Field of Classification Search
CPC .............................. H04B 10/2557; H04J 14/06
(Continued)

(56) References Cited

U.S. PATENT DOCUMENTS

| 7,672,599 B2 * | 3/2010 | Essiambre | ....... H04B 10/25133 |
| | | | 398/159 |
| 8,204,389 B2 * | 6/2012 | Li | ..................... H04B 10/2507 |
| | | | 398/202 |

(Continued)

FOREIGN PATENT DOCUMENTS

| CN | 102082604 A | 6/2011 |
| CN | 102347923 A | 2/2012 |

(Continued)

OTHER PUBLICATIONS

Li et al., "Electronic post-compensation of WDM transmission impairments using coherent detection and digital signal processing", *Optics Express*, Jan. 21, 2008, 9 pp., vol. 16, No. 2.

(Continued)

*Primary Examiner* — Oommen Jacob
(74) *Attorney, Agent, or Firm* — Staas & Halsey LLP

(57) ABSTRACT

A compensation apparatus and method for inter-channel nonlinear damage are disclosed where the apparatus includes: an iteration parameter determining unit configured to determine an iteration step of cross-phase modulation damage compensation performed in each channel in a multichannel optical fiber transmission link; an estimating unit configured to divide an optical fiber transmission link in each iteration step of each channel into one or more optical fiber segments, and perform cross-phase modulation damage estimation at a position in each optical fiber segment where the nonlinear damage is maximal; and a first compensating unit configured to perform cross-phase modulation damage compensation according to the result of the cross-phase modulation damage estimation. By performing cross-phase modulation damage estimation at a position in each optical fiber segment where the nonlinear damage is maximal, cross-phase modulation damage compensation may be per- (Continued)

formed effectively, and performance of the communication system may be improved.

8 Claims, 6 Drawing Sheets

(51) Int. Cl.
*H04Q 11/00* (2006.01)
*H04B 10/079* (2013.01)

(58) Field of Classification Search
USPC .................................................. 398/147, 140
See application file for complete search history.

(56) References Cited

U.S. PATENT DOCUMENTS

| | | | | |
|---|---|---|---|---|
| 2002/0044341 A1* | 4/2002 | Rapp | ................. | H04B 10/2557 359/337 |
| 2010/0165348 A1* | 7/2010 | Fleischer | ............... | G01N 21/41 356/458 |
| 2010/0239262 A1* | 9/2010 | Li | ..................... | H04B 10/2507 398/81 |
| 2013/0266311 A1* | 10/2013 | Cao | ................... | H04B 10/2569 398/29 |

FOREIGN PATENT DOCUMENTS

| | | |
|---|---|---|
| CN | 103178900 A | 6/2013 |
| EP | 2 495 888 A1 | 9/2012 |

OTHER PUBLICATIONS

Chinese Office Action dated Apr. 12, 2017 in Chinese Patent Application No. 201310481659.9.

* cited by examiner

COMPENSATION APPARATUS AND METHOD FOR INTER-CHANNEL NONLINEAR DAMAGE

CROSS REFERENCE TO RELATED APPLICATIONS

This application claims the benefit of Chinese Application No. 201310481659.9, filed Oct. 15, 2013, the disclosure of which is incorporated herein by reference.

BACKGROUND OF THE INVENTION

Technical Field

The present disclosure relates to the field of communications, and in particular to a compensation apparatus and method for inter-channel nonlinear damage.

Background

Currently, wavelength division multiplexing (WDM) systems are widely used in communications. As the number of channels in a wavelength division multiplexing system is relatively large and inter-channel nonlinear damage is relatively obvious, the inter-channel nonlinear damage needs to be estimated and compensated.

As the nonlinear Schrodinger equation may well model a nonlinear effect in an optical fiber, in principle, a digital signal processing-based optical coherent detection receiver and constructing an inverse link may compensate for nonlinear damage in an optical fiber transmission link; wherein, attenuation coefficients, dispersion coefficients and nonlinear coefficients in the inverse link and a transmission link are correspondingly inverse to each other. The nonlinear damage here includes in-channel nonlinear damage resulted from a self-phase modulation (SPM) effect and inter-channel nonlinear damage resulted from a cross-phase modulation (XPM) effect. However, as the number of channels in a wavelength division multiplexing (WDM) system is relatively large, in solving the nonlinear Schrodinger equation to which an inverse link corresponds in a digital domain by using a split step Fourier method, information of each channel is needed, steps need to be strictly controlled, thus the complexity of such calculation is unbearable to current chips.

Currently, the XPM effect may be divided into two types by studying and modeling the XPM effect, that is, phase damage and polarization crosstalk. Some existing algorithms can only be addressed to one type of damage for compensation. Finding a method capable of effectively compensating for the two effects of the XPM at the same time is still a hotspot in the current study. An existing method makes an improvement to a conventional method of compensating for XPM damage based on an inverse link; wherein in each step in the split step Fourier method, a signal needs to pass through a nonlinear compensating module and a linear compensating module, and change of a current signal is performed according to an XPM model. Seen from a simulation result, when a dispersion coefficient of an optical fiber is relatively small, the method may expand a step in the split step Fourier method by about 15 times. However, when a split step length is increased to an optical fiber span, a compensation property of the method decreases remarkably. And a usual link is based on a conventional single-mode optical fiber, a dispersion coefficient of which being more than 4 times of the condition supposed in the method, and at this moment, when the step is equal to a length of the span, the performance of the method will decrease further.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

An object of embodiments of the present disclosure is to provide a compensation apparatus and method for inter-channel nonlinear damage, wherein by performing cross-phase modulation damage estimation at a position in each optical fiber segment in each iteration step of each channel, where the nonlinear damage is maximal, cross-phase modulation damage compensation may be performed effectively, and performance of a communication system may be improved.

According to one aspect of embodiments of the present disclosure, there is provided a compensation apparatus for inter-channel nonlinear damage, including:

an iteration parameter determining unit configured to determine an iteration step of cross-phase modulation damage compensation performed in each channel in a multi-channel optical fiber transmission link;

an estimating unit configured to divide an optical fiber transmission link in each iteration step of each channel into one or more optical fiber segments, and perform cross-phase modulation damage estimation at a position in each optical fiber segment where the nonlinear damage is maximal; and a first compensating unit configured to perform cross-phase modulation damage compensation according to the result of the cross-phase modulation damage estimation.

According to another aspect of embodiments of the present disclosure, there is provided a compensation method for inter-channel nonlinear damage, including:

determining an iteration step of cross-phase modulation damage compensation performed in each channel in a multichannel optical fiber transmission link;

dividing an optical fiber transmission link in each iteration step of each channel into one or more optical fiber segments, and performing cross-phase modulation damage estimation at a position in each optical fiber segment where the nonlinear damage is maximal; and performing cross-phase modulation damage compensation according to the result of the cross-phase modulation damage estimation.

Advantages of embodiments of the present disclosure reside in that by performing cross-phase modulation damage estimation at a position in each optical fiber segment in each iteration step of each channel, where the nonlinear damage is maximal, cross-phase modulation damage compensation may be performed effectively, and performance of a communication system may be improved.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/comprises" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION

These and further features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In existing inverse link transmission methods, nonlinear damage estimation and compensation are performed at signal output ends of optical fiber segments of an optical fiber transmission link. It was found by the inventors of this application that as signal power attenuates gradually along with increase of transmission distance, the nonlinear damage at output ends of the optical fiber segments is minimal, and a result of estimation of nonlinear damage at the output ends is inaccurate, thereby affecting an effect of nonlinear damage compensation. Embodiments of the present disclosure provide a compensation apparatus and method for inter-channel nonlinear damage, in which by performing cross-phase modulation damage estimation at a position in each optical fiber segment in each iteration step of each channel, where the nonlinear damage is maximal, cross-phase modulation damage compensation may be performed effectively, and performance of a communication system may be improved.

The compensation apparatus and method for inter-channel nonlinear damage of embodiments of the present disclosure shall be described below in detail with reference to the accompanying drawings.

Embodiment 1

Figure 1:
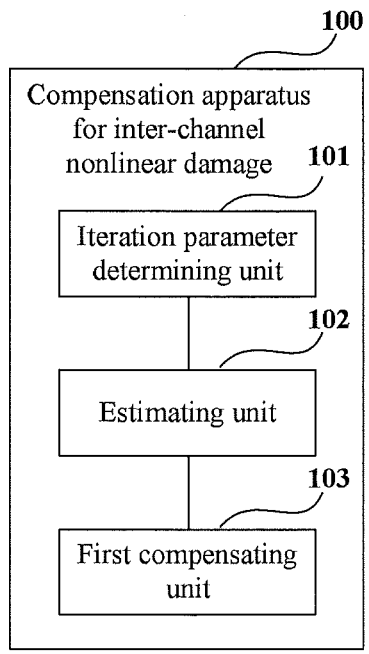
FIG. 1 is a schematic diagram of a structure of a compensation apparatus for inter-channel nonlinear damage of Embodiment 1 of the present disclosure.

FIG. 1 is a schematic diagram of a structure of a compensation apparatus for inter-channel nonlinear damage of Embodiment 1 of the present disclosure, which is applicable to a receiving side of a communication system. As shown in FIG. 1, the apparatus 100 includes an iteration parameter determining unit 101, an estimating unit 102 and a first compensating unit 103; wherein, the iteration parameter determining unit 101 is configured to determine an iteration step of cross-phase modulation damage compensation performed in each channel in a multichannel optical fiber transmission link;

the estimating unit 102 is configured to divide an optical fiber transmission link in each iteration step of each channel into one or more optical fiber segments, and perform cross-phase modulation damage estimation at a position in each optical fiber segment where the nonlinear damage is maximal;

and the first compensating unit 103 is configured to perform cross-phase modulation damage compensation according to the result of the cross-phase modulation damage estimation.

In this embodiment, the compensation apparatus is applicable to any wavelength division multiplexing system based on polarization multiplexing modulation.

In this embodiment, the iteration parameter determining unit 101 is configured to determine an iteration step of cross-phase modulation damage compensation performed in each channel in a multichannel optical fiber transmission link; wherein, the iteration step may be determined according to an actual demand, which may be a length of a whole channel at most, and at this moment, the number of times of iteration is 1. Furthermore, when the number of times of iteration is greater than 1, the iteration steps may be identical or different, and the number of times of iteration and iteration steps are not limited in the present disclosure.

In this embodiment, after the iteration parameter determining unit 101 determines the iteration step, the estimating unit 102 divides an optical fiber transmission link in each iteration step into optical fiber segments, so as to be used for calculating cross-phase modulation (XPM) damage in each optical fiber segment. Wherein, the number of the optical fiber segments may be 1 or more, and a length of each optical fiber segment in each iteration step is not limited in the present disclosure, which may be set according to an actual demand.

In this embodiment, any existing method may be used for determining a position where nonlinear damage is maximal in an optical fiber segment. For example, as signal power attenuates gradually along with increase of transmission distance, and generated nonlinear damage decreases gradually, an input end of each optical fiber segment may be selected as the position where nonlinear damage is maximal; however, the present disclosure is not limited thereto.

In this embodiment, any existing method may be used by the estimating unit 102 for performing the cross-phase modulation (XPM) damage estimation, and the present disclosure is not limited thereto.

It can be seen from the above embodiment that by performing cross-phase modulation damage estimation at a position in each optical fiber segment in each iteration step of each channel, where the nonlinear damage is maximal, cross-phase modulation damage compensation may be performed effectively, and performance of a communication system may be improved.

Embodiment 2

Figure 2:
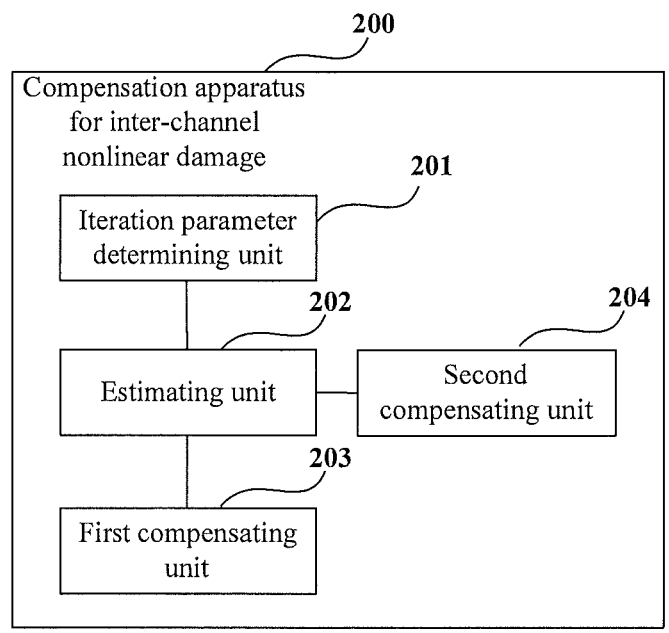
FIG. 2 is a schematic diagram of a structure of a compensation apparatus for inter-channel nonlinear damage of Embodiment 2 of the present disclosure.

FIG. 2 is a schematic diagram of a structure of a compensation apparatus for inter-channel nonlinear damage of Embodiment 2 of the present disclosure, which is applicable to a receiving end of a communication system. As shown in FIG. 2, the apparatus 200 includes an iteration parameter determining unit 201, an estimating unit 202 and a first compensating unit 203; wherein, the iteration parameter determining unit 201 is configured to determine an iteration step of cross-phase modulation damage compensation performed in each channel in a multichannel optical fiber transmission link;

the estimating unit 202 is configured to divide an optical fiber transmission link in each iteration step of each channel into one or more optical fiber segments, and perform cross-phase modulation damage estimation at a position in each optical fiber segment where the nonlinear damage is maximal;

and the first compensating unit 203 is configured to perform cross-phase modulation damage compensation according to the result of the cross-phase modulation damage estimation.

In this embodiment, the estimating unit 202 divides an optical fiber transmission link in each iteration step into segments, so as to calculate cross-phase modulation (XPM) damage in each optical fiber segment, and a length of each optical fiber segment in each iteration step is not limited in the present disclosure, which may be set according to an actual demand.

Figure 3:
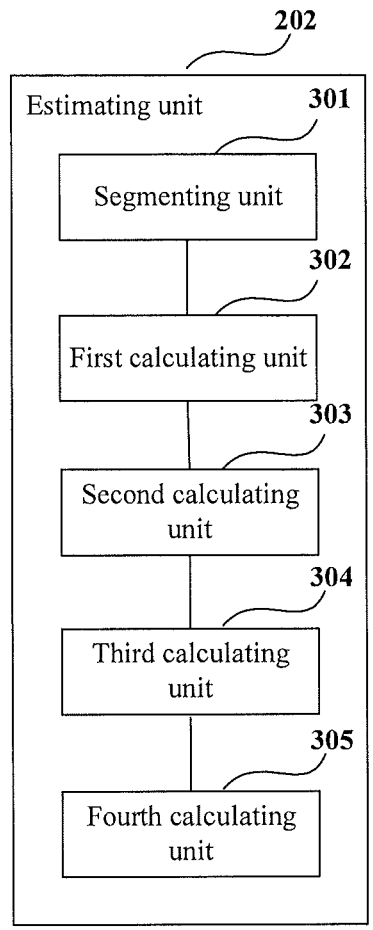
FIG. 3 is a schematic diagram of a structure of the estimating unit of Embodiment 2 of the present disclosure.

In this embodiment, the estimating unit 202 performs cross-phase modulation (XPM) damage estimation at a position in one or more optical fiber segments in each channel where the nonlinear damage is maximal, so as to obtain an estimation result of XPM damage estimation of an optical fiber transmission link in each iteration step. FIG. 3 is a schematic diagram of a structure of the estimating unit 202 of Embodiment 2 of the present disclosure. It should be noted that any existing method may be used by the estimating unit 202 for performing the XP damage estimation, and the present disclosure is not limited thereto.

As shown in FIG. 3, the estimating unit 202 includes a segmenting unit 301, a first calculating unit 302, a second calculating unit 303, a third calculating unit 304 and a fourth calculating unit 305; wherein, the segmenting unit 301 is configured to divide an optical fiber transmission link in each iteration step of each channel into one or more optical fiber segments;

the first calculating unit 302 is configured to calculate an output waveform at a position in each optical fiber segment in each iteration step of each channel, where the nonlinear damage is maximal;

the second calculating unit 303 is configured to calculate cross-phase modulation damage to each optical fiber segment in each iteration step of each channel according to the output waveform;

the third calculating unit 304 is configured to sum up cross-phase modulation damage of all the optical fiber segments in each iteration step of each channel, so as to obtain cross-phase modulation damage to the optical fiber transmission links in each iteration step;

and the fourth calculating unit 305 is configured to calculate cross-phase modulation matrices of the optical fiber transmission links in each iteration step of each channel according to the cross-phase modulation damage to the optical fiber transmission links in each iteration step of each channel, and hence calculate inverse matrices of the cross-phase modulation matrices; and after obtaining the inverse matrices of the cross-phase modulation matrices, the first compensating unit 203 compensates for the cross-phase modulation damage to the optical fiber transmission links in the current iteration step according to the inverse matrices, and a result of compensation is taken as an output signal of the optical fiber transmission link of the current iteration step, and is also taken as an input signal of an optical fiber transmission link of a next iteration step.

In this embodiment, the apparatus may further include a second compensating unit 204; wherein, the second compensating unit 204 is configured to compensate for linear damage and/or self-phase modulation (SPM) damage to each channel before the first compensating unit 203 performs the cross-phase modulation damage compensation.

Wherein, the second compensating unit 204 may be set in each iteration step corresponding to each optical fiber segment, and each second compensating unit compensates for linear damage and/or self-phase modulation (SPM) damage in the optical fiber segment; however, the present disclosure is not limited thereto.

By setting the second compensating unit, linear damage and/or SPM damage in an optical fiber transmission link may be effectively compensated for, thereby further improving performance of the system.

How the estimating unit 202 calculates the inverse matrices of the XPM matrices shall be described below in detail; however, such contents are illustrative only, and should not be construed as a limitation to the present disclosure.

Figure 4:
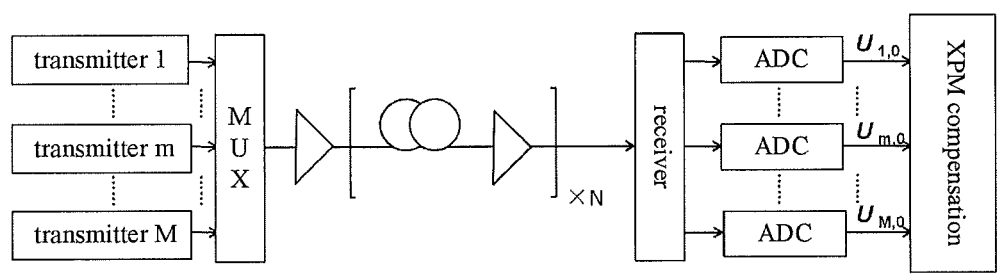
FIG. 4 is a schematic diagram of a structure of a WDM system having a compensating apparatus of Embodiment 2 of the present disclosure.

FIG. 4 is a schematic diagram of a structure of a WDM system having the compensating apparatus 200 of this embodiment. As shown in FIG. 4, a WDM system based on polarization multiplexing modulation includes M channels, each channel being numbered with digits 1-M in an ascending order of carrier central frequencies, and it is assumed that a coherent receiver receives signals of all the M paths in a same polarization system.

Figure 5:
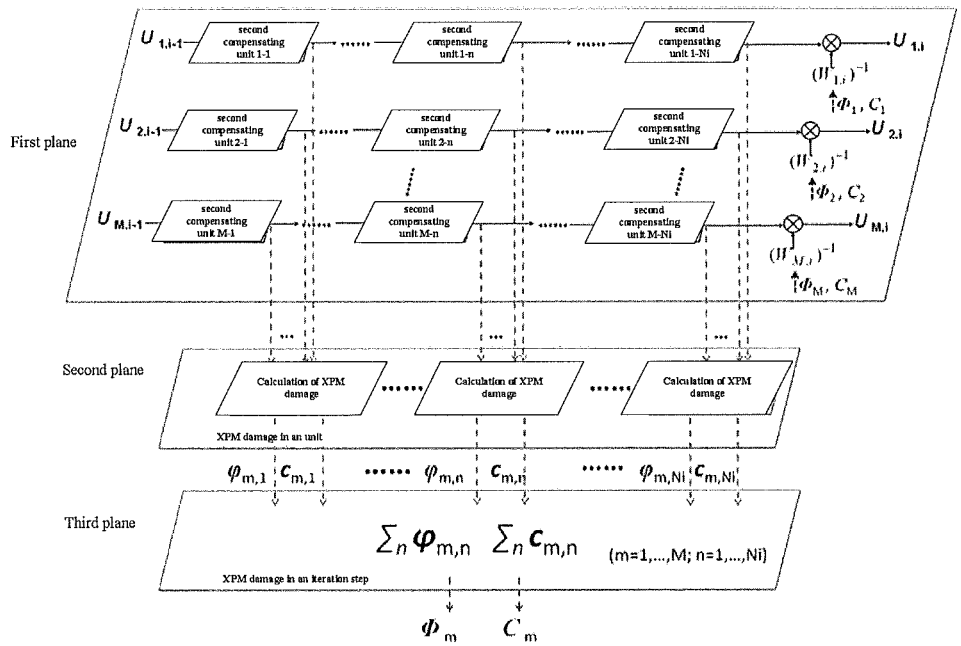
FIG. 5 is a flowchart of a method for compensating for each channel with respect to dispersion and nonlinear damage.

FIG. 5 is a flowchart of a method for compensating for each channel with respect to dispersion and nonlinear damage. As shown in FIG. 5, a first plane denotes XPM compensation for each path of signal in an iteration step of each channel; wherein, after passing through several second compensating units, the inverse matrices of the XPM damage are used to compensate for the XPM damage in the iteration step. Wherein, each second compensating unit may complete compensation for linear damage and/or nonlinear damage (such as SPM damage, etc.) of each optical fiber segment in the optical fiber transmission link within the iteration step; and wherein, the linear damage may be, for example, dispersion, and channel walk-off, etc.; and the nonlinear damage may be, for example, SPM damage, etc.; and the second compensating units may have identical or different internal structures.

The calculation of the first plane corresponds to the first calculating unit 302 and the second compensating unit 204, that is, an output waveform at a position where nonlinear damage is maximal in each optical fiber segment within the iteration step is outputted from the first plane to a second plane. The second plane denotes calculation of XPM damage in each optical fiber segment in the optical fiber transmission link within an iteration step, and corresponding to the second calculating unit 303, that is, XPM damage to each optical fiber segment within the iteration step is outputted from the second plane to a third plane.

The third plane denotes calculation of XPM damage to an optical fiber transmission link within an iteration step, and corresponds to the third calculating unit 304, that is, XPM damage to the optical fiber transmission link within the iteration step is outputted from the third plane.

The XPM matrix $W_{m,i}$ of the optical fiber transmission link within the iteration step is calculated according to the XPM damage to the optical fiber transmission link within the iteration step outputted from the third plane, thereby calculating the inverse matrix $(W_{m,i})^{-1}$ of the cross-phase modulation matrix.

Where, as shown in FIG. 5, $U_{m,i}$ denotes an input signal of an i-th iteration step of an m-th channel, that is, an output signal of an (i−1)-th iteration step, $W_{m,i}$ denotes an XPM matrix of the i-th iteration step of the m-th channel, $\phi_{m,n}$ and $c_{m,n}$ denote XPM phase damage and polarization crosstalk to the m-th channel in an n-th optical fiber segment within the i-th iteration step, respectively, and $\Phi_m$ and $C_m$ denote a sum of XPM phase damage and a sum of polarization crosstalk to all optical fiber segments within the i-th iteration step of the m-th channel, respectively, m, n and i being integers greater than 0.

The calculation and compensation processes of the planes in FIG. 5 shall be described below in detail, respectively.

In this embodiment, assuming that the number of iteration of each channel is K, the number of optical fiber spans of each channel is N, and iteration steps are equal to each other, an optical fiber transmission link of each iteration step includes $N_i$=N/K consecutive optical fiber spans; where, both K and N are integers greater than 0. And it is assumed that $N_i$ is an integer. Furthermore, an optical fiber transmission link in each iteration step is divided into $N_i$ optical fiber segments, each optical fiber segment being an optical fiber span.

In this embodiment, as illustrative explanation, each optical fiber segment in each iteration step corresponds to an optical fiber span; however, relationship between an optical fiber span and an optical fiber segment divided in each iteration step is not limited in the present disclosure.

In this embodiment, the optical fiber transmission link within each iteration step may include an integral number of optical fiber spans, and may also include a non-integral number of optical fiber spans; however, the present disclosure is not limited thereto.

Wherein, the iteration compensation is performed in an inverse order of the optical fiber spans in the optical fiber transmission link, that is, the first iteration compensates linear and nonlinear damage in an N-th to an (N−$N_i$+1)-th optical fiber spans in the optical fiber transmission link;

the second iteration compensates linear and nonlinear damage in the (N−$N_i$+1)-th to an (N−2$N_i$+2)-th optical fiber spans in the optical fiber transmission link;

and so on; the K-th iteration compensates linear and nonlinear damage in an ($N_i$−1)-th optical fiber span in the optical fiber transmission link.

As shown in the first plane in FIG. 5, assuming that the first to the ($N_i$−1)-th second compensating units within each iteration step of each channel respectively perform dispersion and channel walk-off compensation in the optical fiber spans to which they correspond, frequency characteristics of these second compensating units may be expressed by formula (1) below:

$$H_{LI,m,n}(\omega)=\exp(-j\omega^2\beta_{2,n}L_n/2)*\exp(-j\omega\Delta\beta_{1,m,n}L_n)$$
$$1 \le m \le M, \ 1 \le n \le N_i-1 \qquad (1);$$

where, $\beta_{2,n}$ denotes a group speed dispersion coefficient of the n-th optical fiber span within the iteration step, $\Delta\beta_{1,m,n}$ denotes a group speed difference between an m-th channel in the optical fiber span and a reference channel, $L_n$ denotes a length of the optical fiber span, and $\omega$ denotes an angular frequency; wherein, $1 \le m \le M$, $1 \le n \le N_i-1$, and the negative sign in formula (1) denotes compensation is performed to the dispersion and channel walk-off damage in the optical fiber span.

Assuming that the $N_i$-th second compensating unit in each iteration step of each channel not only performs dispersion and channel walk-off compensation in the $N_i$-th optical fiber span in the iteration step, but also performs phase compensation for SPM damage in all the $N_i$ optical fiber spans within the iteration step, a frequency domain characteristic of the second compensating unit may be expressed by formula (2) below:

$$H_{LI,m,n}(\omega)=\text{FT}\{\text{IFT}[\exp(-j\omega^2\beta_{2,n}L_n/2)*\exp(-j\omega\Delta$$
$$\beta_{1,m,n}L_n)]*\exp(-j\theta_{SPM,m})\} \ 1 \le m \le M, \ n=N_i \qquad (2);$$

where, FT denotes Fourier transform, IFT denotes inverse Fourier transform, and $\theta_{SPM,m}$ denotes SPM phase damage to the m-th channel in all the $N_i$ optical fiber spans within the iteration step.

It can be seen from the first plane in FIG. 5 and formulae (1) and (2) that for any channel, relationship between an input signal and an output signal in one time of iteration may be expressed by formula (3) below:

$$U_{m,i}=(W_{m,i})^{-1} \times (u_{m,i-1} \otimes h_{LI,m1} \otimes h_{LI,m,2} \otimes \cdots$$
$$\otimes h_{LI,m,N_i}) \qquad (3);$$

where, $U_{m,i-1}$ and $U_{m,i}$ denote respectively an input signal and an output signal of an optical fiber transmission link of an i-th iteration step of the m-th channel, $W_{m,i}$ denotes an XPM matrix acting on the m-th channel and corresponding to the i-th iteration step, inverse operation $(W_{m,i})^{-1}$ of the matrix denoting compensation for the XPM damage; and $h_{LI,m,n}=\text{IFT}(H_{LI,m,n})$, $H_{LI,m,n}$ denoting a frequency characteristic of the m-th channel in performing compensation for the linear damage and/or self-phase modulation damage in the n-th optical fiber span of the current iteration step, m, i and n being integers greater than 0.

As shown in the first plane in FIG. 5, XPM damage in all the optical fiber spans within the i-th iteration step of the m-th channel is concentrated in the XPM matrix $W_{m,i}$, and according to the XPM Jones matrix model, $W_{m,i}$ and $(W_{m,i})^{-1}$ may be respectively expressed by formulae (4) and (5) below:

$$W_{m,i} = \exp\left(j\varepsilon\frac{\Phi_{x,m}+\Phi_{y,m}}{2}\right)\begin{bmatrix} \sqrt{1-|\varepsilon C_{y,m}|^2}\exp\left(j\varepsilon\frac{\Phi_{x,m}-\Phi_{y,m}}{2}\right) & \varepsilon C_{x,m} \\ \varepsilon C_{y,m} & \sqrt{1-|\varepsilon C_{x,m}|^2}\exp\left(-j\varepsilon\frac{\Phi_{x,m}-\Phi_{y,m}}{2}\right) \end{bmatrix}, \quad (4)$$

$$(W_{m,i})^{-1} = \tag{5}$$
$$\exp\left(-j3\varepsilon\frac{\Phi_{x,m}+\Phi_{y,m}}{2}\right)\begin{bmatrix} \sqrt{1-|\varepsilon C_{y,m}|^2}\exp\left(-j\varepsilon\frac{\Phi_{x,m}-\Phi_{y,m}}{2}\right) & -\varepsilon C_{x,m} \\ -\varepsilon C_{y,m} & \sqrt{1-|\varepsilon C_{x,m}|^2}\exp\left(j\varepsilon\frac{\Phi_{x,m}-\Phi_{y,m}}{2}\right) \end{bmatrix};$$

where, $\Phi_{x,m}$, $\Phi_{y,m}$, $C_{yx,m}$ and $C_{xy,m}$ denote estimation values of a phase noise component and a polarization crosstalk component acting on two polarization directions of the m-th channel and corresponding to the i-th iteration step, and $\varepsilon$ denotes an adjusting factor of the XPM damage, with which the algorithm may achieve an optimal compensation effect, m and i being integers greater than 0.

Wherein, the XPM damage $\Phi_{x,m}$, $\Phi_{y,m}$, $C_{yx,m}$ and $C_{xy,m}$ in formulae (4) and (5) is XPM damage generated in all the optical fiber spans within the current iteration step. Wherein, the second and third planes shown in FIG. 5 illustrate calculation processes of $\Phi_m = [\Phi_{x,m}, \Phi_{y,m}]^T$ and $C_m = [C_{x,m}, C_{y,m}]^T$.

As shown in the second plane in FIG. 5, this plane performs calculation of XPM damage in each optical fiber span within an iteration step. After the first plane completes compensation for linear damage of a first optical fiber span within the i-th iteration step, a signal of each channel is inputted into the second plane, and XPM phase damage $\phi_{m,n}$ and polarization crosstalk damage $c_{m,n}$ to each channel in the first optical fiber span within the iteration step are calculated according to formulae (6) and (7) below:

$$\varphi_{m,n} = \sum_{m'=1, m'\neq m}^{M} I_{m',n} \otimes h_{(m',m),n} = \begin{bmatrix} \sum_{m'=1, m'\neq m}^{M} |u_{m'x,n}|^2 \otimes h_{(m',m),n} \\ \sum_{m'=1, m'\neq m}^{M} |u_{m'y,n}|^2 \otimes h_{(m',m),n} \end{bmatrix}, \tag{6}$$

$$c_{m,n} = \tag{7}$$
$$\sum_{m'=1, m'\neq m}^{M} X_{m',n} \otimes h_{(m',m),n} = \begin{bmatrix} \sum_{m'=1, m'\neq m}^{M} ju_{m'x}(u_{m'y,n})^* \otimes h_{(m',m),n} \\ \sum_{m'=1, m'\neq m}^{M} ju_{m'y}(u_{m'x,n})^* \otimes h_{(m',m),n} \end{bmatrix};$$

where, M denotes the number of received channels, $u_{mx,n}$ and $u_{my,n}$ denote signals at the two polarization states of the m-th channel transmitted by the first plane to the second plane after the compensation for the linear damage to the n-th optical fiber span within the iteration step is completed, $I_m = [|u_{mx,n}|^2, |u_{my,n}|^2]^T$, which denotes a signal intensity vector, and $h_{(m',m),n}$ denotes a time domain impulse response of the m-th channel to the XPM damage to the m-th channel in the n-th optical fiber span within the iteration step, and its frequency domain transmission characteristic may be expressed by formula (8) below:

$$H_{(m',m),n}(\omega) = FT[h_{(m',m),n}] = \frac{8\gamma_n}{9} \times \frac{1-\exp(-\alpha_n L_n + j\Delta\beta'_{m',m}\omega L_n)}{\alpha_n - j\Delta\beta'_{m',m}\omega}; \tag{8}$$

where, $L_n$, $\alpha_n$ and $\gamma_n$ denote respectively length, attenuation and nonlinear coefficients of the n-th optical fiber span within the iteration step, and $\Delta\beta_{m',m}'$ denotes a group speed difference of an m'-th channel relative to the m-th channel As $\Delta\beta_{m',m}' = -\Delta\beta_{m,m'}'$, and the transmission characteristic of the XPM damage satisfies $H_{(m',m),n} = (H_{(m,m'),n})^*$, only M(M-1)/2 XPM filters need to be calculated in the calculation of the XPM damage to each optical fiber span in the second plane.

Figure 6:
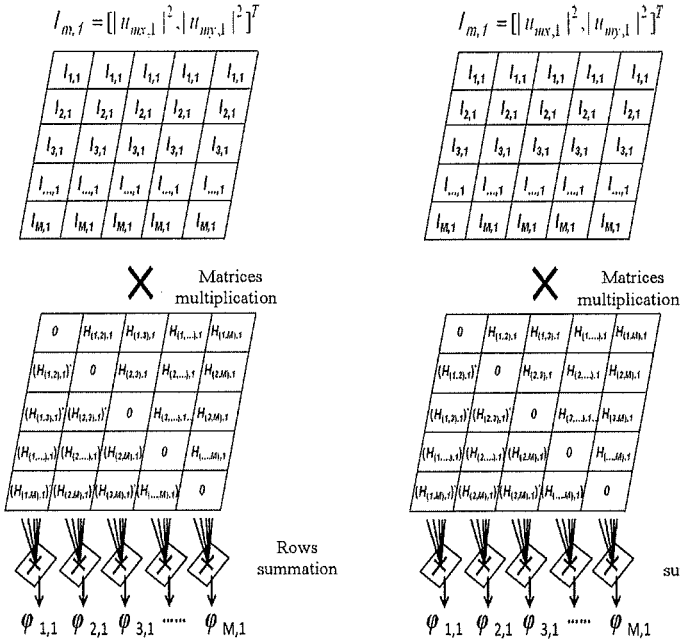
FIG. 6 is a flowchart of a method for calculating XPM damage expressed in formulae (6), (7) and (8) of Embodiment 2 of the present disclosure.

FIG. 6 is a flowchart of a method for calculating XPM damage expressed in formulae (6), (7) and (8) of this embodiment. According to the method shown in FIG. 6, if the first plane completes compensation for linear damage to an optical fiber span within the iteration step, calculation of the XPM damage in the optical fiber span is performed in the second plane according to formulae (6), (7) and (8).

As shown in the third plane in FIG. 5, after the second plane performs calculation of the linear damage to each optical fiber span within the i-th iteration step of each channel, a sum of XPM damage in $N_i$ optical fiber spans within the iteration step of each channel may be calculated according to formulae (9) and (10) below:

$$\Phi_m = \begin{bmatrix} \Phi_{x,m} \\ \Phi_{y,m} \end{bmatrix} = \sum_{n=1}^{N_i} \varphi_{m,n}, \tag{9}$$

$$C_m = \begin{bmatrix} C_{x,m} \\ C_{y,m} \end{bmatrix} = \sum_{n=1}^{N_i} c_{m,n}; \tag{10}$$

where, $\phi_{m,n}$ and $c_{m,n}$ are respectively XPM phase damage and polarization crosstalk to the m-th channel in the n-th optical fiber span within the i-th iteration step, and $\Phi_m$ and $C_m$ denote respectively a sum of the XPM phase damage and a sum of the polarization crosstalk to the m-th channel in all the optical fiber spans within the i-th iteration step, m, n and i being integers greater than 0.

Calculation results of formulae (9) and (10) are fed back to the first calculating plane, and an inverse matrix of an XPM matrix is calculated according to formula (5), thereby completing compensation for the XPM damage.

What described above is a calculation process within an iteration step, and calculation and compensation are repeated according to formulae (1) to (10), until the iteration comes to the end, thereby completing compensation for dispersion and nonlinear damage to each channel.

The above calculation and compensation processes are illustrative only, and are intended to limit the present disclosure. In this embodiment, any existing method may be used in the compensation in the first plane for the SPM damage. For example, compensation is performed before or after the linear compensation by each second compensating unit, or compensation is performed in the same compensating unit as shown in above formula (2); however, it is not limited in the present disclosure.

It can be seen from the above embodiment that by performing cross-phase modulation damage estimation at a position in each optical fiber segment in each iteration step of each channel, where the nonlinear damage is maximal, cross-phase modulation damage compensation may be performed effectively, and performance of a communication system may be improved.

And by split-step iteration compensation, accuracy of cross-phase modulation damage compensation may further be improved, thereby further improving the performance of the communication system.

Furthermore, by setting a second compensating unit, linear damage and/or SPM damage in an optical fiber transmission link may be compensated effectively, thereby further improving the performance of the communication system.

Embodiment 3

Figure 7:
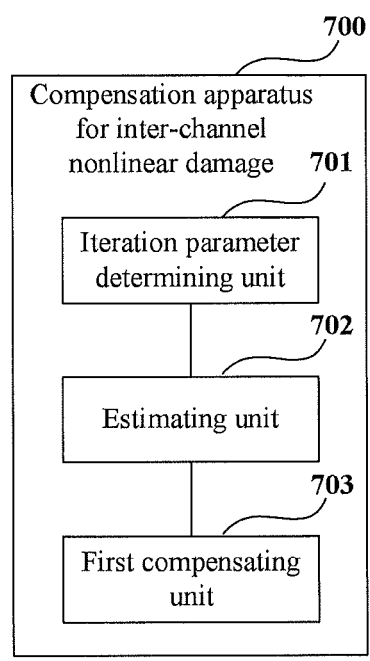
FIG. 7 is a schematic diagram of a structure of a compensation apparatus for inter-channel nonlinear damage of Embodiment 3 of the present disclosure.

FIG. 7 is a schematic diagram of a structure of a compensation apparatus for inter-channel nonlinear damage of Embodiment 3 of the present disclosure, which is applicable to a receiving side of a communication system. The apparatus 700 includes an iteration parameter determining unit 701, an estimating unit 702 and a first compensating unit 703; wherein, the iteration parameter determining unit 701 is configured to determine an iteration step of cross-phase modulation damage compensation performed in each channel in a multichannel optical fiber transmission link;

the estimating unit 702 is configured to divide an optical fiber transmission link in each iteration step of each channel into one or more optical fiber segments, and perform cross-phase modulation damage estimation at a position in each optical fiber segment where the nonlinear damage is maximal according to cross-phase modulation damage to a channel in a predefined distance from the current channel;

and the first compensating unit 703 is configured to perform cross-phase modulation damage compensation according to the result of the cross-phase modulation damage estimation.

The difference between this embodiment and embodiments 1 and 2 resides in that in performing estimation of XPM damage, as XPM damage of a channel relatively far away to the current channel is relatively small, XPM damage of a channel relatively near the current channel may only be taken into account, thereby effectively lowering complexity of calculation.

In this embodiment, a distance between two channels is defined by, for example, a ratio of a difference between carrier central frequencies of any two channels to a WDM channel interval, then a distance of the m'-th channel relative to the m-th channel is m-m'.

In this embodiment, for example, if XPM damage resulted from channels at distances within [−d, d] from the current channel is only taken into account, the number of XPM filters needing to be calculated is reduced from M(M−1)/2 to d(2M−d−1)/2; where, M is the number of channels of the WDM, d>0, d denoting a maximum distance from the current channel. According to such a condition, formulae (11) and (12) are obtained from above formulae (6) and (7):

$$\varphi_{m,n} = \sum_{m'=\max(m-d,1),m'\neq m}^{\min(m+d,M)} I_{m',n} \otimes h_{(m',m),n} = \qquad (11)$$

$$\begin{bmatrix} \sum_{m'=\max(m-d,1),m'\neq m}^{\min(m+d,M)} |u_{m'x,n}|^2 \otimes h_{(m',m),n} \\ \sum_{m'=\max(m-d,1),m'\neq m}^{\min(m+d,M)} |u_{m'y,n}|^2 \otimes h_{(m',m),n} \end{bmatrix},$$

$$c_{m,n} = \sum_{m'=\max(m-d,1),m'\neq m}^{\min(m+d,M)} X_{m',n} \otimes h_{(m',m),n} = \qquad (12)$$

$$\begin{bmatrix} \sum_{m'=\max(m-d,1),m'\neq m}^{\min(m+d,M)} ju_{m'x}(u_{m'y,n})^* \otimes h_{(m',m),n} \\ \sum_{m'=\max(m-d,1),m'\neq m}^{\min(m+d,M)} ju_{m'y}(u_{m'x,n})^* \otimes h_{(m',m),n} \end{bmatrix};$$

where, M denotes the number of received channels, $u_{mx,n}$ and $u_{my,n}$ denote signals at the two polarization states of the m-th channel transmitted by the first plane to the second plane after the compensation for the linear damage to the n-th optical fiber span within the iteration step is completed, $I_m = [|u_{mx,n}|^2, |u_{my,n}|^2]^T$, which denotes a signal intensity vector, and $h_{(m',m),n}$ denotes a time domain impulse response of the m'-th channel to the XPM damage to the m-th channel in the n-th optical fiber span within the iteration step.

The structure of the estimating unit, the method for calculating the XPM damage matrix and the compensation method of this embodiment are identical to those described in Embodiment 1 or 2, which shall not be described herein any further.

It can be seen from the above embodiment that by performing cross-phase modulation damage estimation at a position in each optical fiber segment in each iteration step of each channel, where the nonlinear damage is maximal, cross-phase modulation damage compensation may be performed effectively, and performance of a communication system may be improved.

And by taking XPM damage of a channel relatively near the current channel only into account, complexity of calculation may be effectively lowered.

Embodiment 4

Figure 8:
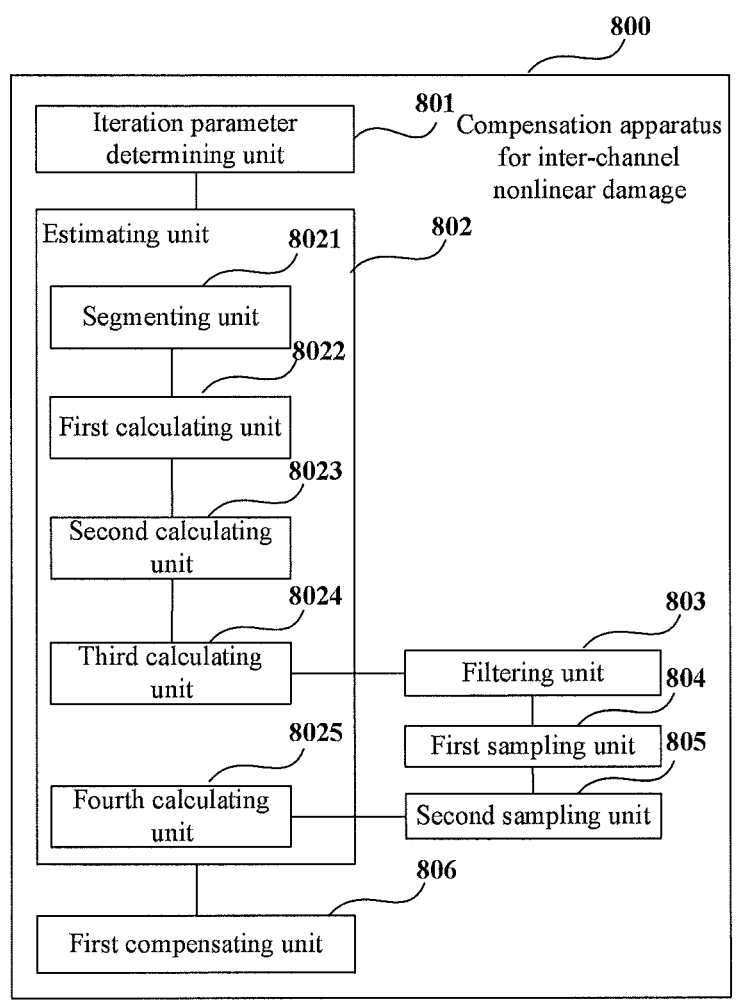
FIG. 8 is a schematic diagram of a structure of the compensation apparatus for inter-channel nonlinear damage of Embodiment 4 of the present disclosure.

FIG. 8 is a schematic diagram of a structure of a compensation apparatus for inter-channel nonlinear damage of Embodiment 4 of the present disclosure, which is applicable to a receiving side of a communication system. The apparatus 800 includes an iteration parameter determining unit 801, an estimating unit 802, a filtering unit 803, a first sampling unit 804, a second sampling unit 805 and a first compensating unit 806; wherein, the estimating unit 802 is configured to divide an optical fiber transmission link in each iteration step of each channel into one or more optical fiber segments, and perform cross-phase modulation damage estimation at a position in each optical fiber segment where the nonlinear damage is maximal; wherein, the estimating unit 802 includes a segmenting unit 8021, a first calculating unit 8022, a second calculating unit 8023, a third calculating unit 8024 and a fourth calculating unit 8025, with the structures and function of the segmenting unit 8021, the first calculating unit 8022, the second calculating unit 8023 and the third calculating unit 8024 being identical to those described in Embodiment 2, which shall not be described herein any further;

the filtering unit 803 is configured to perform low-pass filtering to the result of calculation of the third calculating unit;

the first sampling unit 804 is configured to perform down sampling to the result of low-pass filtering;

the second sampling unit 805 is configured to perform up sampling to the result of down sampling, so as to obtain a recovered cross-phase modulation damage waveform;

the fourth calculating unit 8025 calculates the inverse matrices of the cross-phase modulation matrices according to the recovered cross-phase modulation damage waveform;

and the first compensating unit 806 is configured perform cross-phase modulation damage compensation according to the inverse matrices of the cross-phase modulation matrices.

In this embodiment, as a change of a waveform of XPM damage calculated by the third calculating unit is relatively slow, a result of calculation of the third calculating unit is transmitted at a relatively low speed to the fourth calculating unit after it is downlink sampled, and is recovered by uplink sampling, so as to calculate the inverse matrices, thereby effectively achieving low-speed data transmission.

In this embodiment, any existing low-pass filter may be used as the filtering unit 803, and it is not limited in the present disclosure.

For example, the filtering unit 803 may include an average value calculator, that is to divide an input signal into blocks and then calculate an average value of each block; output of the first sampling unit 804 is an average value sequence; and the second sampling unit 805 uses sampling maintenance to recover an XPM damage waveform of $2R_S$; wherein, $R_S$ denotes a symbol rate.

For another example, the filtering unit 803 may include a narrow-band low-pass filter (such as a rectangular filter, a root-raised cosine filter, and a Bessel filter, etc.) of a bandwidth far lower than the symbol rate, with a unilateral bandwidth $f_{LPF}$ of the low-pass filter being far lower than a symbol rate $R_S$ of a signal; the first sampling unit 804 downlink samples the filtered signal at a rate of $2f_{LPF}$, with a rate of the downlink sampled signal being lowered to $f_{LPF}/R_S$ time of the original rate; and the second sampling unit 805 performs uplink sampling through interpolation (such a sinc interpolator, and cubic interpolation, etc.), so as to recover an XPM damage waveform of $2R_S$.

The method for calculating the XPM damage matrix and the method of compensation of this embodiment are identical to those described in Embodiment 2, which shall not be described herein any further.

It can be seen from the above embodiment that by performing cross-phase modulation damage estimation at a position in each optical fiber segment in each iteration step of each channel, where the nonlinear damage is maximal, cross-phase modulation damage compensation may be performed effectively, and performance of a communication system may be improved.

And by recovering a XPM damage waveform by uplink sampling after downlink sampling and transmitting so as to calculate inverse matrices of XPM matrices, data transmission rate may be effectively lowered.

Embodiment 5

Figure 9:
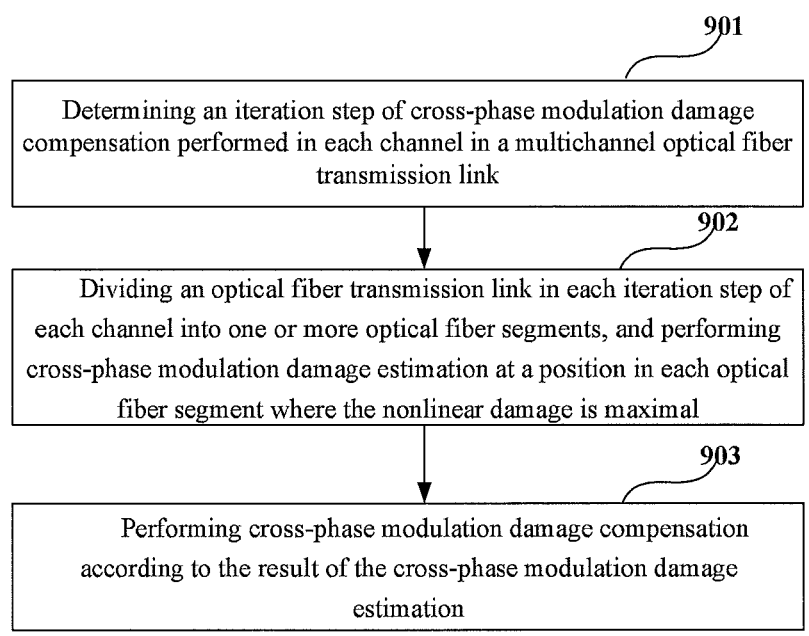
FIG. 9 is a flowchart of a compensation method for inter-channel nonlinear damage of Embodiment 5 of the present disclosure.

FIG. 9 is a flowchart of a compensation method for inter-channel nonlinear damage of Embodiment 5 of the present disclosure, which corresponds to the compensation apparatus for inter-channel nonlinear damage of Embodiment 1. As shown in FIG. 9, the method includes:

step 901: determining an iteration step of cross-phase modulation damage compensation performed in each channel in a multichannel optical fiber transmission link;

step 902: dividing an optical fiber transmission link in each iteration step of each channel into one or more optical fiber segments, and performing cross-phase modulation damage estimation at a position in each optical fiber segment where the nonlinear damage is maximal; and step 903: performing cross-phase modulation damage compensation according to the result of the cross-phase modulation damage estimation.

In this embodiment, a method for determining the position where the nonlinear damage is maximal and the method for performing the cross-phase modulation (XPM) damage estimation are identical to those described in Embodiment 1, and the method for calculating the XPM matrices and the method for performing the compensation according to the matrices may be identical to those described in Embodiment 2 or Embodiment 3 or Embodiment 4, which shall not be described herein any further.

It can be seen from the above embodiment that by performing cross-phase modulation damage estimation at a position in each optical fiber segment in each iteration step of each channel, where the nonlinear damage is maximal, cross-phase modulation damage compensation may be performed effectively, and performance of a communication system may be improved.

The above apparatus and method of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above.

The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

Supplement 1. A compensation apparatus for inter-channel nonlinear damage, including:

an iteration parameter determining unit configured to determine an iteration step of cross-phase modulation damage compensation performed in each channel in a multichannel optical fiber transmission link;

an estimating unit configured to divide an optical fiber transmission link in each iteration step of each channel into one or more optical fiber segments, and perform cross-phase modulation damage estimation at a position in each optical fiber segment where the nonlinear damage is maximal; and a first compensating unit configured to perform cross-phase modulation damage compensation according to the result of the cross-phase modulation damage estimation.

Supplement 2. The apparatus according to supplement 1, wherein the estimating unit includes:

a segmenting unit configured to divide an optical fiber transmission link in each iteration step of each channel into one or more optical fiber segments;

a first calculating unit configured to calculate an output waveform at a position in each optical fiber segment in each iteration step where the nonlinear damage is maximal;

a second calculating unit configured to calculate cross-phase modulation damage to each optical fiber segment in each iteration step of each channel according to the output waveform;

a third calculating unit configured to sum up cross-phase modulation damage of all the optical fiber segments in each iteration step of each channel, so as to obtain cross-phase modulation damage to the optical fiber transmission links in each iteration step; and a fourth calculating unit configured to calculate cross-phase modulation matrices of the optical fiber transmission links in each iteration step of each channel according to the cross-phase modulation damage to the optical fiber transmission links in each iteration step of each channel, and hence calculate inverse matrices of the cross-phase modulation matrices;

and the first compensating unit compensates for the cross-phase modulation damage to the optical fiber transmission links in each iteration step of each channel according to the inverse matrices of the cross-phase modulation matrices.

Supplement 3. The apparatus according to supplement 1, wherein the apparatus further includes:

a second compensating unit configured to compensate for linear damage and/or self-phase modulation damage to each channel before the first compensating unit performs the cross-phase modulation damage compensation.

Supplement 4. The apparatus according to supplement 2, wherein the first calculating unit calculates the output waveform of each iteration step of each channel according to formula (1) below:

$$U_{m,i}=(W_{m,i})^{-1}\times(U_{m,i-1}\otimes h_{LI,m,1}\otimes h_{LI,m,2}\otimes \ldots \otimes h_{LI,m,N_i}) \quad (1);$$

where, $U_{m,i-1}$ and $U_{m,i}$ respectively denote an input signal and an output signal of an optical transmission link of an i-th iteration step of an m-th channel, $W_{m,i}$ denotes a cross-phase modulation matrix corresponding to the i-th iteration step and acting on the m-th channel, and $h_{LI,m,n}=\text{IFT}(H_{LI,m,n})$, $H_{LI,m,n}$ denoting a frequency characteristic of the linear damage and/or self-phase modulation damage compensation performed at an n-th optical fiber segment of the current iteration step of the m-th channel, and m, i and n being integers greater than 0.

Supplement 5. The apparatus according to supplement 2, wherein the fourth calculating unit calculates the inverse matrices of the cross-phase modulation matrices according to formula (2) below:

where, $\Phi_{x,m}$, $\Phi_{y,m}$, $C_{yx,m}$ and $C_{xy,m}$ respectively denote estimation values of a phase noise component and a polarization crosstalk component in two polarization directions corresponding to the i-th iteration step and acting on the m-th channel, and $\epsilon$ denotes an adjustment factor of XPM damage, m and i being integers greater than 0.

Supplement 6. The apparatus according to supplement 1, wherein, the estimating unit performs the cross-phase modulation damage estimation at the position in each optical fiber segment where the nonlinear damage is maximal according to cross-phase modulation damage to a channel within a predefined distance from the current channel.

Supplement 7. The apparatus according to supplement 2, wherein the apparatus further includes:

a filtering unit configured to perform low-pass filtering to the result of calculation of the third calculating unit;

a first sampling unit configured to perform down sampling to the result of low-pass filtering; and a second sampling unit configured to perform up sampling to the result of down sampling, so as to obtain a recovered cross-phase modulation damage waveform;

and the fourth calculating unit calculates the inverse matrices of the cross-phase modulation matrices according to the recovered cross-phase modulation damage waveform.

Supplement 8. The apparatus according to any one of supplements 1-7, wherein the estimating unit is configured to perform the cross-phase modulation damage estimation at an input end of each optical fiber segment in each iteration step of each channel.

Supplement 9. A compensation method for inter-channel nonlinear damage, including:

determining an iteration step of cross-phase modulation damage compensation performed in each channel in a multichannel optical fiber transmission link;

dividing an optical fiber transmission link in each iteration step of each channel into one or more optical fiber segments, and performing cross-phase modulation damage estimation at a position in each optical fiber segment where the nonlinear damage is maximal; and performing cross-phase modulation damage compensation according to the result of the cross-phase modulation damage estimation.

Supplement 10. The method according to supplement 9, wherein the step of performing cross-phase modulation damage estimation at a position in each optical fiber segment where the nonlinear damage is maximal includes:

calculating an output waveform at a position in each optical fiber segment in each iteration step where the nonlinear damage is maximal;

calculating cross-phase modulation damage to each optical fiber segment in each iteration step of each channel according to the output waveform;

summing up cross-phase modulation damage of all the optical fiber segments in each iteration step of each channel, $$(W_{m,i})^{-1} = \exp\left(-j3\varepsilon\frac{\Phi_{x,m}+\Phi_{y,m}}{2}\right)\begin{bmatrix} \sqrt{1-|\varepsilon C_{y,m}|^2}\exp\left(-j\varepsilon\frac{\Phi_{x,m}-\Phi_{y,m}}{2}\right) & -\varepsilon C_{x,m} \\ -\varepsilon C_{y,m} & \sqrt{1-|\varepsilon C_{x,m}|^2}\exp\left(j\varepsilon\frac{\Phi_{x,m}-\Phi_{y,m}}{2}\right) \end{bmatrix}; \quad (2)$$

so as to obtain cross-phase modulation damage to the optical fiber transmission links in each iteration step; and calculating cross-phase modulation matrices of the optical fiber transmission links in each iteration step of each channel according to the cross-phase modulation damage to the optical fiber transmission links in each iteration step of each channel, and hence calculating inverse matrices of the cross-phase modulation matrices;

and the step of performing cross-phase modulation damage compensation according to the result of the cross-phase modulation damage estimation includes: compensating for the cross-phase modulation damage to the optical fiber transmission links in each iteration step of each channel according to the inverse matrices of the cross-phase modulation matrices.

Supplement 11. The method according to supplement 9, wherein the method further includes:

compensating for linear damage and/or self-phase modulation damage to each channel before the first compensating unit performs the cross-phase modulation damage compensation.

Supplement 12. The method according to supplement 10, wherein the output waveform of each iteration step of each channel is calculated according to formula (1) below:

$$U_{m,i} = (W_{m,i})^{-1} \times (U_{m,i-1} \otimes h_{LI,m,1} \otimes h_{LI,m,2} \otimes \ldots \otimes h_{LI,m,N_i}) \quad (1);$$

where, $U_{m,i-1}$ and $U_{m,i}$ respectively denote an input signal and an output signal of an optical transmission link of an i-th iteration step of an m-th channel, $W_{m,i}$ denotes a cross-phase modulation matrix corresponding to the i-th iteration step and acting on the m-th channel, and $h_{LI,m,n} = \text{IFT}(H_{LI,m,n})$, $H_{LI,m,n}$ denoting a frequency characteristic of the linear damage and/or self-phase modulation damage compensation performed at an n-th optical fiber segment of the current iteration step of the m-th channel, and m, i and n being integers greater than 0.

Supplement 13. The method according to supplement 10, wherein the inverse matrices of the cross-phase modulation matrices are calculated according to formula (2) below:

$$(W_{m,i})^{-1} = \exp\left(-j3\varepsilon\frac{\Phi_{x,m}+\Phi_{y,m}}{2}\right)\begin{bmatrix} \sqrt{1-|\varepsilon C_{y,m}|^2}\exp\left(-j\varepsilon\frac{\Phi_{x,m}-\Phi_{y,m}}{2}\right) & -\varepsilon C_{x,m} \\ -\varepsilon C_{y,m} & \sqrt{1-|\varepsilon C_{x,m}|^2}\exp\left(j\varepsilon\frac{\Phi_{x,m}-\Phi_{y,m}}{2}\right) \end{bmatrix}; \quad (2)$$

where, $\Phi_{x,m}$, $\Phi_{y,m}$, $C_{yx,m}$ and $C_{xy,m}$ respectively denote estimation values of a phase noise component and a polarization crosstalk component in two polarization directions corresponding to the i-th iteration step and acting on the m-th channel, and $\varepsilon$ denotes an adjustment factor of XPM damage, m and i being integers greater than 0.

Supplement 14. The method according to supplement 9, wherein, the step of performing cross-phase modulation damage estimation at a position in each optical fiber segment where the nonlinear damage is maximal includes: performing the cross-phase modulation damage estimation at the position in each optical fiber segment where the nonlinear damage is maximal according to cross-phase modulation damage to a channel within a predefined distance from the current channel.

Supplement 15. The method according to supplement 10, wherein the method further includes:

performing low-pass filtering to the cross-phase modulation damage to the optical fiber transmission links in each iteration step;

performing down sampling to the result of low-pass filtering; and performing up sampling to the result of down sampling, so as to obtain a recovered cross-phase modulation damage waveform;

and the step of calculating cross-phase modulation matrices of the optical fiber transmission links in each iteration step of each channel according to the cross-phase modulation damage to the optical fiber transmission links in each iteration step of each channel, and hence calculating inverse matrices of the cross-phase modulation matrices, includes: calculating the inverse matrices of the cross-phase modulation matrices according to the recovered cross-phase modulation damage waveform.

Supplement 16. The method according to any one of supplements 9-15, wherein the step of performing cross-phase modulation damage estimation at a position in each optical fiber segment where the nonlinear damage is maximal includes: performing the cross-phase modulation damage estimation at an input end of each optical fiber segment in each iteration step of each channel.

The invention claimed is:

1. A compensation apparatus for inter-channel nonlinear damage compensation, the apparatus comprising:

an iteration parameter determining unit configured to determine an iteration step of cross-phase modulation damage compensation performed in each channel in a multichannel optical fiber transmission link model;

an estimating unit configured to divide an optical fiber transmission link model in each iteration step of each channel into at least one optical fiber segment, and perform cross-phase modulation damage estimation at an input end of each optical fiber segment according to cross phase modulation damage to a channel within a predefined distance from a current channel; and a first compensating unit configured to perform cross-phase modulation damage compensation according to a result of the cross-phase modulation damage estimation.

2. The apparatus according to claim 1, wherein the estimating unit comprises:

a segmenting unit configured to divide an optical fiber transmission link model in each iteration step of each channel into the at least one optical fiber segment;

a first calculating unit configured to calculate an output waveform at the input end of each optical fiber segment in each iteration step;

a second calculating unit configured to calculate cross-phase modulation damage to each optical fiber segment in each iteration step of each channel according to the output waveform;

a third calculating unit configured to sum cross-phase modulation damage of all optical fiber segments in each iteration step of each channel, to obtain cross-phase modulation damage to the optical fiber transmission link model in each iteration step; and a fourth calculating unit configured to calculate cross-phase modulation matrices of the optical fiber transmission link model in each iteration step of each channel according to the cross-phase modulation damage to the optical fiber transmission link model in each iteration step of each channel, and calculate inverse matrices of the cross-phase modulation matrices; and wherein the first compensating unit compensates for the cross-phase modulation damage to the optical fiber transmission link model in each iteration step of each channel according to the inverse matrices of the cross-phase modulation matrices.

3. The apparatus according to claim 1, wherein the apparatus further comprises:

a second compensating unit configured to compensate for one of linear damage, self-phase modulation damage, or linear damage and self-phase modulation damage to each channel before the first compensating unit performs the cross-phase modulation damage compensation.

4. The apparatus according to claim 2, wherein the first calculating unit calculates the output waveform of each iteration step of each channel according to formula (1) below:

$$U_{m,i} = (W_{m,i})^{-1} \times (U_{m,i-1} \otimes h_{LI,m,1} \otimes h_{LI,m,2} \otimes \ldots \otimes h_{LI,m,N_i}) \quad (1);$$

where, $U_{m,i-1}$ and $U_{m,i}$ respectively denote an input signal and an output signal of an optical transmission link model of an i-th iteration step of an m-th channel, $W_{m,i}$ denotes a cross-phase modulation matrix corresponding to the i-th iteration step and acting on the m-th channel, and $h_{LI,m,n} = \mathrm{IFT}(H_{LI,m,n})$, $H_{LI,m,n}$ denoting a frequency characteristic of one of the linear damage, the self-phase modulation damage, or the linear damage and self-phase modulation damage compensation performed at an n-th optical fiber segment of the current iteration step of the m-th channel, and m, i and n being integers greater than 0.

5. The apparatus according to claim 2, wherein the fourth calculating unit calculates the inverse matrices of the cross-phase modulation matrices according to formula (2) below:

$$(W_{m,i})^{-1} = \exp\left(-j3\varepsilon \frac{\Phi_{x,m} + \Phi_{y,m}}{2}\right) \begin{bmatrix} \sqrt{1 - |\varepsilon C_{y,m}|^2} \exp\left(-j\varepsilon \frac{\Phi_{x,m} - \Phi_{y,m}}{2}\right) & -\varepsilon C_{x,m} \\ -\varepsilon C_{y,m} & \sqrt{1 - |\varepsilon C_{x,m}|^2} \exp\left(j\varepsilon \frac{\Phi_{x,m} - \Phi_{y,m}}{2}\right) \end{bmatrix}; \quad (2)$$

where, $\Phi_{x,m}$, $\Phi_{y,m}$, $C_{yx,m}$ and $C_{xy,m}$ respectively denote estimation values of a phase noise component and a polarization crosstalk component in two polarization directions corresponding to the i-th iteration step and acting on the m-th channel, and $\varepsilon$ denotes an adjustment factor of XPM damage, m and i being integers greater than 0.

6. The apparatus according to claim 2, wherein the apparatus further comprises:

a filtering unit configured to perform low-pass filtering on the result of the calculation of the third calculating unit;

a first sampling unit configured to perform down sampling on a result of the low-pass filtering; and a second sampling unit configured to perform up sampling on a result of down sampling to obtain a recovered cross-phase modulation damage waveform; and wherein the fourth calculating unit calculates the inverse matrices of the cross-phase modulation matrices according to the recovered cross-phase modulation damage waveform.

7. A compensation method for inter-channel nonlinear damage compensation, the method comprising:

determining an iteration step of cross-phase modulation damage compensation performed in each channel in a multichannel optical fiber transmission link model;

dividing an optical fiber transmission link model in each iteration step of each channel into at least one optical fiber segments, and performing cross-phase modulation damage estimation at an input end of each optical fiber segment according to cross-phase modulation damage to a channel within a predefined distance from a current channel; and performing cross-phase modulation damage compensation according to a result of the cross-phase modulation damage estimation.

8. The method according to claim 7, wherein performing cross-phase modulation damage estimation at the input end of each optical fiber segment comprises:

calculating an output waveform at the input end of each optical fiber segment in each iteration step;

calculating cross-phase modulation damage of each optical fiber segment in each iteration step of each channel according to the output waveform;

summing cross-phase modulation damage of all optical fiber segments in each iteration step of each channel to obtain cross-phase modulation damage to the optical fiber transmission link model in each iteration step; and calculating cross-phase modulation matrices of the optical fiber transmission link model in each iteration step of each channel according to the cross-phase modulation damage to the optical fiber transmission link model in each iteration step of each channel, and calculating inverse matrices of the cross-phase modulation matrices; and wherein the step of performing cross-phase modulation damage compensation according to the result of the cross-phase modulation damage estimation comprises:

compensating for the cross-phase modulation damage to the optical fiber transmission link model in each iteration step of each channel according to the inverse matrices of the cross-phase modulation matrices.

* * * * *